United States Patent
Nakayama et al.

(10) Patent No.: US 10,312,762 B2
(45) Date of Patent: Jun. 4, 2019

(54) COIL, ROTATING ELECTRICAL MACHINE EQUIPPED WITH SAME, AND METHOD FOR MANUFACTURING SAME

(71) Applicant: Hitachi Automotive Systems, Ltd., Hitachinaka-shi, Ibaraki (JP)

(72) Inventors: Kenichi Nakayama, Hitachinaka (JP); Tomohiro Fukuda, Hitachinaka (JP); Akira Toba, Hitachinaka (JP); Shinji Yamazaki, Hitachinaka (JP); Takashi Genmoto, Hitachinaka (JP); Naoki Nishikawa, Hitachinaka (JP); Hisaya Shimizu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 746 days.

(21) Appl. No.: 14/776,291

(22) PCT Filed: Dec. 13, 2013

(86) PCT No.: PCT/JP2013/083414
§ 371 (c)(1),
(2) Date: Sep. 14, 2015

(87) PCT Pub. No.: WO2014/141556
PCT Pub. Date: Sep. 18, 2014

(65) Prior Publication Data
US 2016/0036282 A1    Feb. 4, 2016

(30) Foreign Application Priority Data
Mar. 15, 2013   (JP) ................. 2013-052612

(51) Int. Cl.
*H02K 3/30*     (2006.01)
*H02K 3/32*     (2006.01)
(Continued)

(52) U.S. Cl.
CPC ............. *H02K 3/30* (2013.01); *H02K 3/38* (2013.01); *H02K 15/0056* (2013.01); *H02K 15/12* (2013.01)

(58) Field of Classification Search
CPC .. H02K 1/04; H02K 3/30; H02K 3/32; H02K 3/38; H02K 15/06; H02K 15/12;
(Continued)

(56) References Cited

U.S. PATENT DOCUMENTS 4,724,345 A    2/1988    Elton et al.
6,333,573 B1   12/2001   Nakamura
(Continued)

FOREIGN PATENT DOCUMENTS

JP     61-22739 A      1/1986
JP     61022739 A   *   1/1986  ............... H02K 3/38
(Continued)

OTHER PUBLICATIONS

International Search Report (PCT/ISA/210) dated Apr. 1, 2014, with English translation (Four (4) pages).
(Continued)

*Primary Examiner* — Edgardo San Martin
(74) *Attorney, Agent, or Firm* — Crowell & Moring LLP

(57) ABSTRACT

Provided are a coil having excellent insulation properties, a rotating electrical machine equipped with the same, and a method for manufacturing the same. The coil (60) has a covered portion where a conductive body (602) is covered with an insulating film (612) and a stripped portion where the insulating film is stripped off, and the stripped portion is electrophoretically coated with a resin material (601). The coil (60) may have a configuration wherein segment conductors (28) each having a covered portion and stripped portion are included, connection parts are formed by the stripped portions of two different segment conductors (28)
(Continued)

being connected at coil ends (62), and the thickness of the resin material (601) is no more than the thickness of the insulating film (612) at the boundary portion (630) between the covered portion and the stripped portion.

6 Claims, 10 Drawing Sheets

(51) Int. Cl.
*B05D 5/12* (2006.01)
*H02K 15/12* (2006.01)
*H02K 3/38* (2006.01)
*H02K 15/00* (2006.01)

(58) Field of Classification Search
CPC .... H02K 15/068; H02K 15/0056; H01R 4/00; B05D 5/12
See application file for complete search history.

(56) References Cited

U.S. PATENT DOCUMENTS

| | | | | |
|---|---|---|---|---|
| 6,933,652 B2* | 8/2005 | Higashino | ................ | H02K 3/38 310/201 |
| 6,943,466 B2* | 9/2005 | Oohashi | ................... | H02K 3/38 310/180 |
| 8,448,334 B2* | 5/2013 | Perry | ....................... | H02K 3/30 174/120 R |
| 8,716,914 B2* | 5/2014 | Tanaka | ..................... | H02K 1/04 310/216.004 |
| 8,884,488 B2* | 11/2014 | Nakamura | ............... | H02K 3/38 29/596 |
| 8,981,613 B2* | 3/2015 | Ikuta | ........................ | H02K 3/38 310/201 |
| 9,837,882 B2* | 12/2017 | Nakano | ................ | H02K 15/105 |
| 9,979,265 B2* | 5/2018 | Hattori | ................. | H02K 15/085 |
| 2012/0097447 A1 | 4/2012 | Muraki et al. | | |
| 2014/0300239 A1* | 10/2014 | Takizawa | ................. | H02K 3/12 310/208 |

FOREIGN PATENT DOCUMENTS

| | | |
|---|---|---|
| JP | 2001-54247 A | 2/2001 |
| JP | 2003-125563 A | 4/2003 |
| JP | 3770263 B2 | 4/2006 |
| JP | 2012-90433 A | 5/2012 |
| JP | 2013-38932 A | 2/2013 |

OTHER PUBLICATIONS

Chinese-language Office Action issued in counterpart Chinese Application No. 201380074712.1 dated Jan. 3, 2017 (eight (8) pages).

* cited by examiner

FIG. 3
(a) 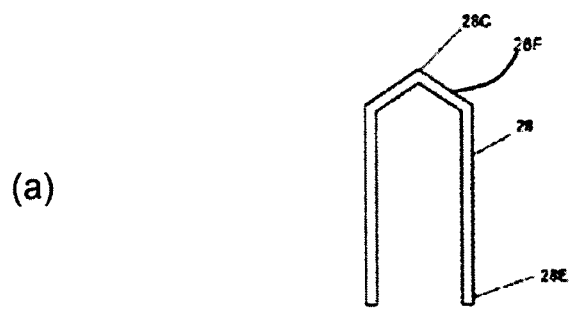
(b) 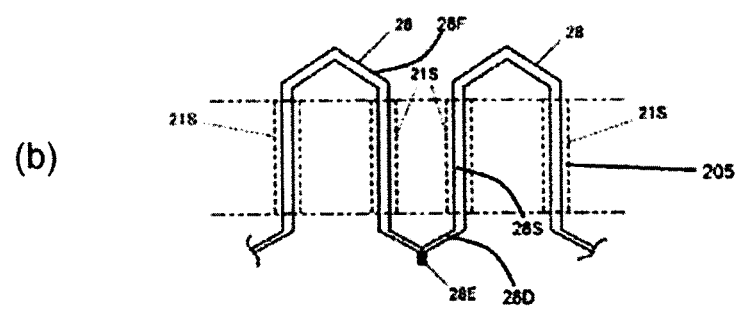
(c) 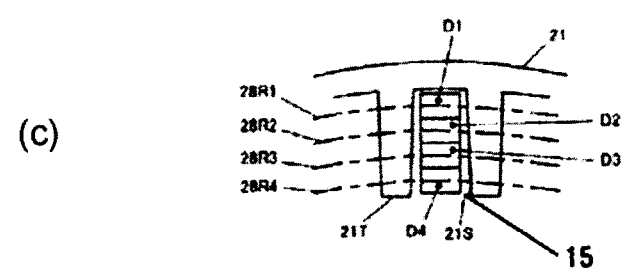

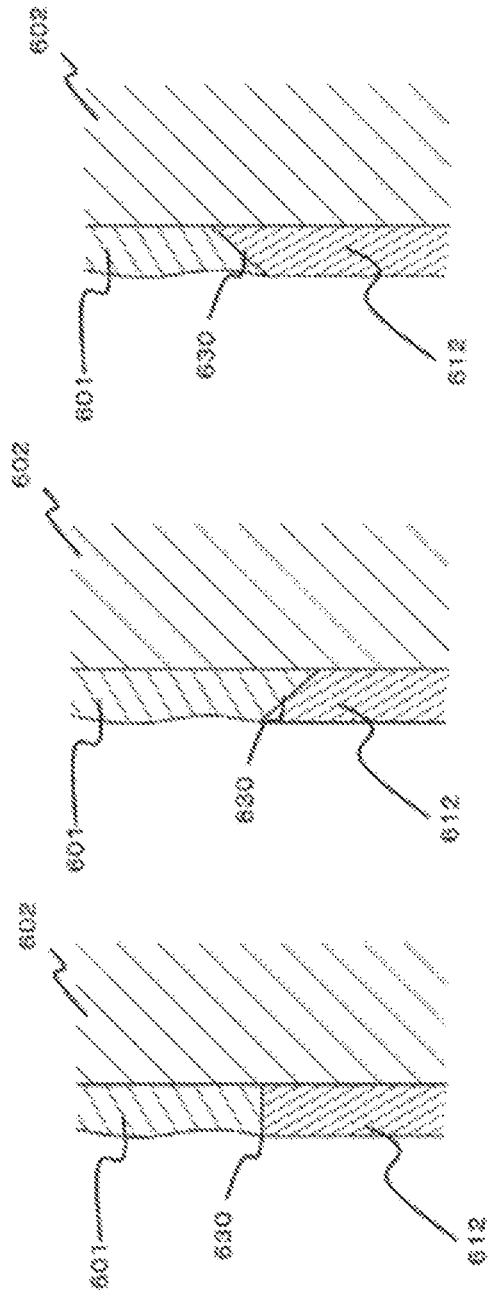

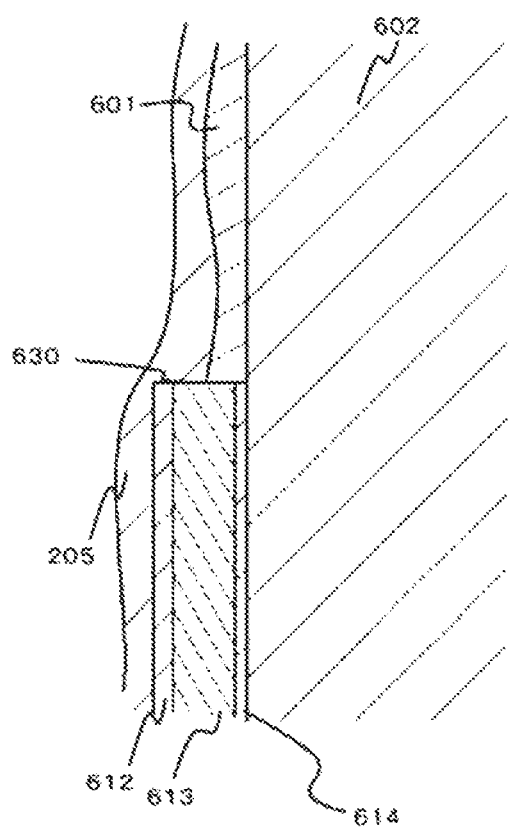

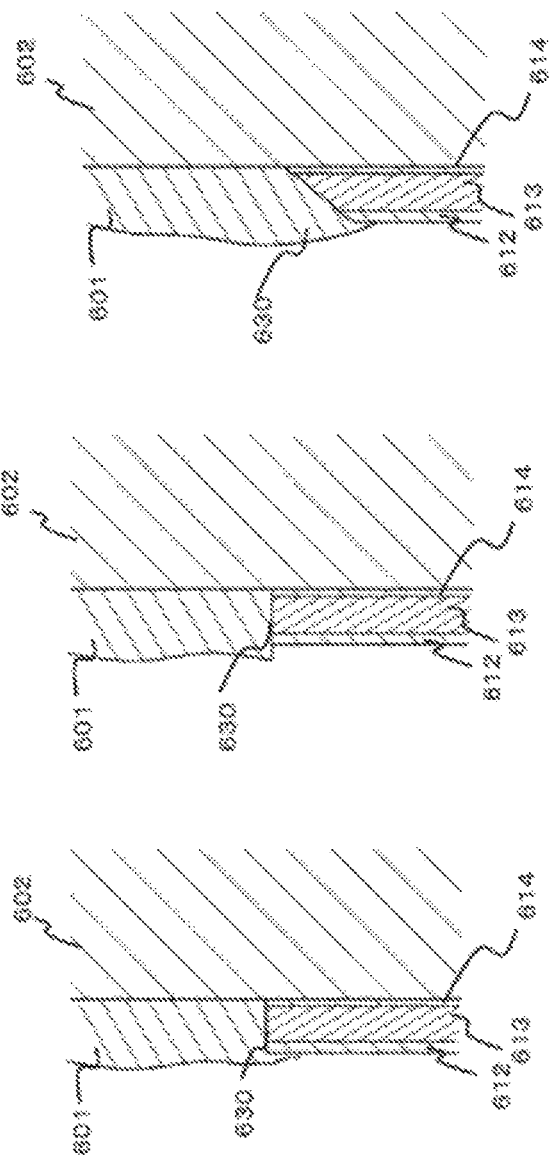

COIL, ROTATING ELECTRICAL MACHINE EQUIPPED WITH SAME, AND METHOD FOR MANUFACTURING SAME

TECHNICAL FIELD

The present invention relates to coils, rotating electrical machines, and methods for manufacturing the same.

BACKGROUND ART

For coping with recent global warming, there have been needs smaller-sized and higher-output rotating electrical machines. As such rotating electrical machines, example, there have been known rotating electrical machines having a stator core including a plurality of slots opened in their inner periphery side, and a plurality of segment conductors with a substantially-U shape which are inserted in the respective slots, thereby increasing the space factor for increasing the cooling performance for realizing higher outputs.

Further, there have been stators vehicle AC electric generators which include a first coil end group having turn portions formed therein, and a second coil end group having a plurality of bonded portions placed therein, wherein these bonded portions are constituted by tip end portions bonded to each other, wherein a first resin material with a smaller thickness is adhered to the first coil end group and the second coil end group, and a second resin material with a larger thickness is adhered to only the vicinity of the bonded portions in the second coil end group, in order to improve the insulation performance (refer to PTL 1, for example).

Further, there have been electrical apparatuses in which the material of the second resin material used at the bonded portions is specified (refer to PTL 2, for example).

CITATION LIST

Patent Literature

PTL 1: JP 3770263 B1
PTL 2: JP 2012-90433 A

SUMMARY OF INVENTION

Technical Problem

The technique in PTL 1 necessitates use of two types of resin materials, and also, is adapted to adhere to the second resin material with a larger thickness to the vicinity of the bonded portions in the second coil end group. In designing the insulation, the resin materials in the coil ends can be made to have substantially uniform thicknesses, and it is not necessarily necessary to make their thicknesses larger only in the vicinity of the bonded portions. Due to the use of the two types of the resin materials, there is a need for double production facilities for adhesion and drying of the resin materials. Further, since de resin materials are made to have a larger thickness only at the bonded portions, there has been the problem of necessity of a material in addition the resin material required for an insulation withstand voltage.

The technique in PTL 2 is devised as a substitute for the second resin material (powder epoxy-based varnish) used in PTL 1, wherein a liquid-type resin is used at a bonded portion for preventing powder dusts. However, this applied to only the bonded portion, and this technique is predicated on use of two types of resin materials and, therefore, does not overcome the aforementioned problem.

Solution to Problem

In order to overcome the aforementioned problem, the structures described in claims are employed, for example. The present application includes a plurality of solutions to the above problems, and examples thereof include a coil including: a covered portion including a conductive body and an insulating film covering the conductive body; and a stripped portion at which the insulating film has been stripped off; wherein the stripped portion is provided with coating of a resin material through electrodeposition.

Advantageous Effects of Invention

According to the present invention, it is possible to provide a coil with an excellent insulation property, a rotating electrical machine including the same, and a method for manufacturing the same. Other problems, structures and advantages than those described above will be apparent from the following description about examples.

BRIEF DESCRIPTION OF DRAWINGS

FIGS. 3A-3C are a view illustrating segment conductors in a stator coil, wherein (a) is a view illustrating a single segment conductor, (b) is a view illustrating the formation of a coil using the segment conductors, and (c) is a view illustrating the placement of the segment conductors in a slot.

FIGS. 6A-6C are plan views of a boundary portion of a bare conductor with an insulating film in the stator coil, wherein (a) is a view of a case where a resin material has been adhered when the insulating film is flat, (b) is a view of a case where the resin material has been adhered when the insulating film is outwardly diagonal, and (c) is a view of a case where the resin material has been adhered when the insulating film is inwardly diagonal.

FIG. 8 is a plan view of a boundary portion of a bare conductive body with an insulating film in the stator coil, which has been covered with a varnish.

FIGS. 9A-9C are plan views of a boundary portion of a bare conductive body with an insulating film in the stator coil, wherein (a) is a view of a case where a resin material has been adhered to have a larger thickness than that of the insulating film, (b) is a view of a case where the resin material has been adhered to have a larger thickness than that of the insulating film, and (c) is a view of a case where the resin material has been adhered to have a larger thickness than that of the insulating film when the insulating film is diagonal.

DESCRIPTION OF EMBODIMENTS

Hereinafter, an example of the present invention will be described, with reference to the drawings. Further, in the following description, a motor for use in a hybrid vehicle will be used as an example of a rotating electrical machine. Further, in the following description, the term "axial direction" refers to the direction along a rotational shaft of the rotating electrical machine. The term "circumferential direction" refers to the direction along the direction of rotations of the rotating electrical machine. The term "radial direction" refers to the direction of moving radius (the direction of radius), assuming that the rotational shaft of the rotating electrical machine is the center. The term "inner periphery side" refers to the inner side in the radial direction (the inner-diameter side), while the term "outer periphery side" refers to the opposite side therefrom, namely the outer side in the radial direction (the outer-diameter side).

Figure 1:
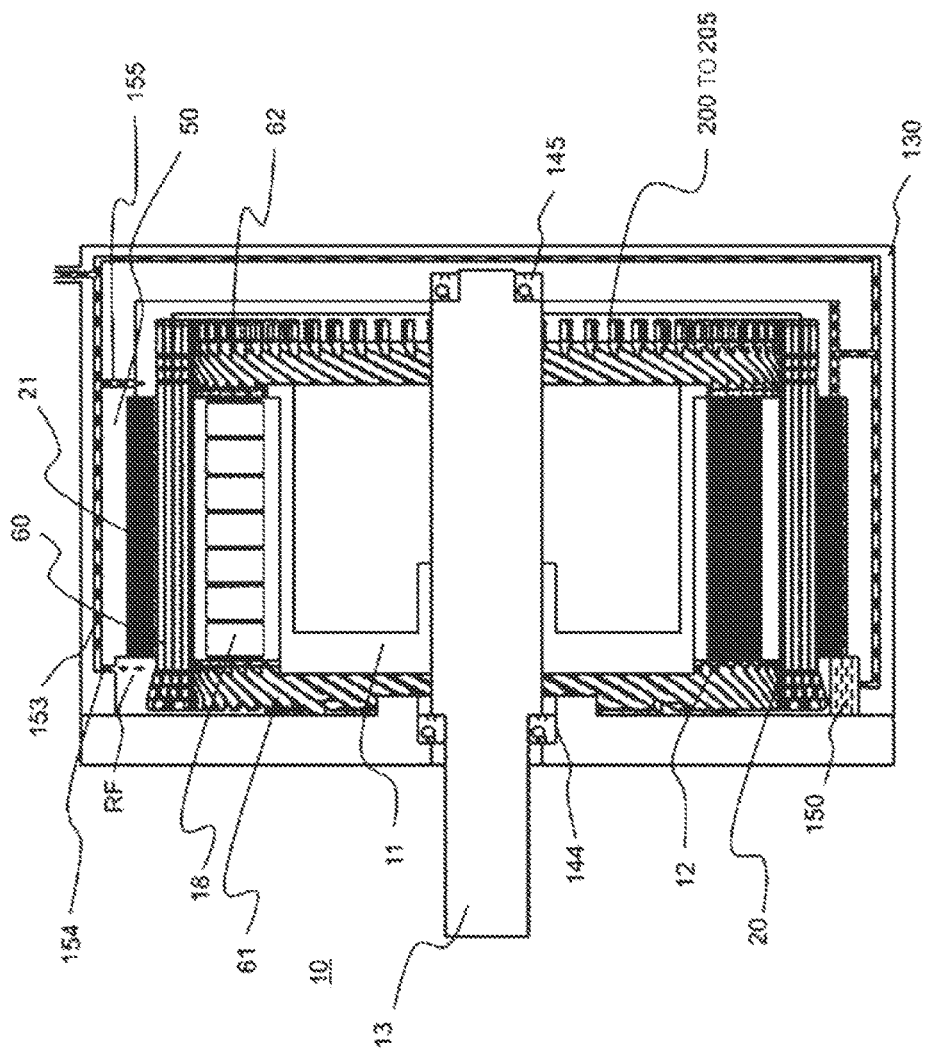
FIG. 1 is a cross-sectional view illustrating the entire structure of a rotating electrical machine device including a stator in an example of the present invention.

FIG. 1 is a cross-sectional view illustrating a rotating electrical machine including a stator according to the present invention. The rotating electrical machine 10 is constituted by a housing 50, a stator 20, a stator core 21, a stator coil 60, and a rotor 11.

The stator 20 is secured to the inner periphery side of the housing 50. The rotor 11 is rotatably supported on the inner periphery side of the stator 20. The housing 50 forms an outer cover of a motor, which is formed by cutting an iron-based material such as a carbon steel or by molding or pressing a cast steel or an aluminum alloy into a cylindrical shape. The housing 50 is also referred to as a frame body or a frame.

A liquid-cooling jacket 130 is secured to the outer periphery side of the housing 50. The inner peripheral wall of the liquid-cooling jacket 130 and the outer peripheral wall of the housing 50 form a refrigerant path 153 for a liquid refrigerant RF such as an oil or ATF (Automatic Transmission Fluid), and the refrigerant path 153 is formed in such a way as to prevent liquid leakage therefrom.

The liquid-cooling jacket 130 houses bearings 144 and 145 and is also referred to as a bearing bracket.

In cases of direct liquid cooling, the refrigerant RF passes through the refrigerant path 153 and flows toward the stator 20 through refrigerant outlets 154 and 155 to cool, the stator 20. The stator 20 can be also directly fastened through bolts or shrinkage-fitted to a case, without providing the housing 50.

The stator 20 is constituted by the stator core 21 and the stator coil 60. The stator core 21 is constituted by thin plates made of silicon-steel plates which are laminated. The stator coil 60 is wound in a plurality of slots 15 provided in the inner peripheral portion of the stator core 21. Heat generated from the stator coil 60 is transferred to the liquid-cooling jacket 130 through the stator core 21 and is dissipated therefrom through the refrigerant RF flowing through the liquid-cooling jacket. 130.

The rotor 11 is constituted by a rotor core 12 and a rotational shaft 13. The rotor core 12 is constituted by thin plates made of silicon-steel plates which are laminated. The rotational shaft 13 secured to the center of the rotor core 12. The rotational shaft. 13 is rotatably held by the bearings 144 and 145 which are mounted to the liquid-cooling jacket 130 and is rotated at a predetermined position in the stator 20 which is a position opposed to the stator 20. Further, the rotor 11 is provided with a permanent magnet 18 and an end ring (not illustrated).

The rotating electrical machine is assembled as follows. The stator 20 is inserted into the inside of the housing 50 and is mounted to the inner peripheral, wall of the housing 50 beforehand and, thereafter, the rotor 11 is inserted into the stator 20. Next, they are assembled to the liquid-cooling jacket 130, such that the bearings 144 and 145 are fitted to the rotational shaft 13.

Figure 2:
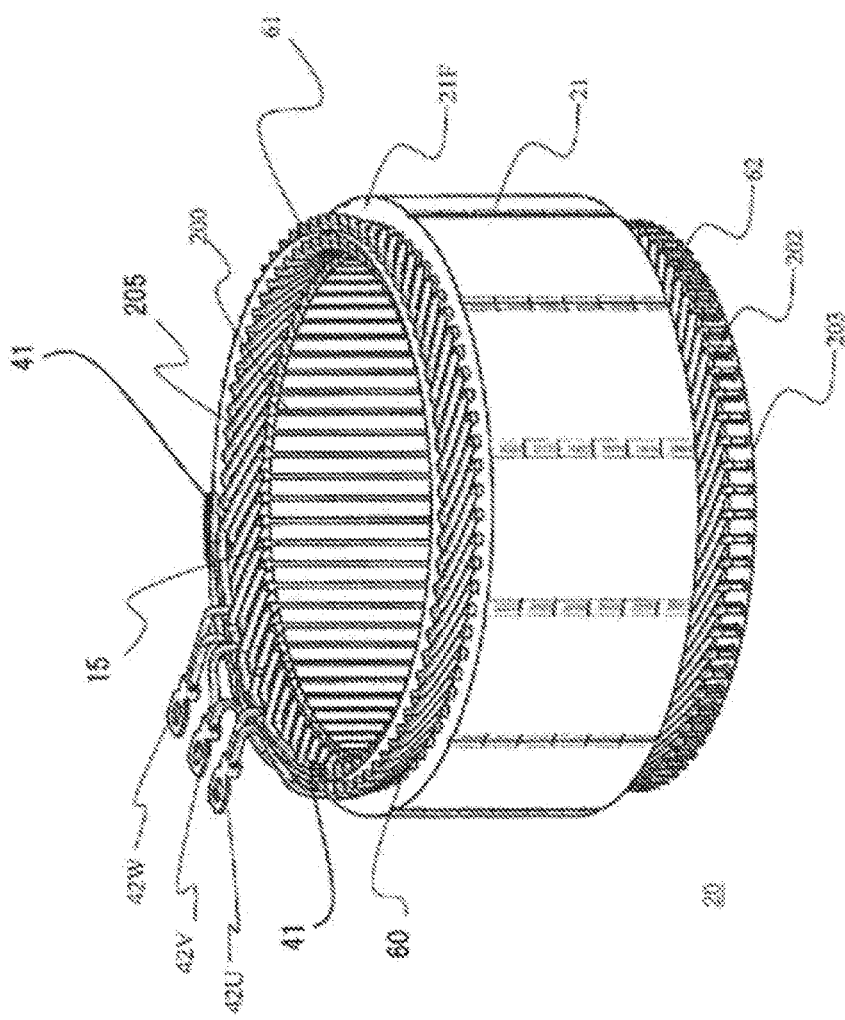
FIG. 2 is a perspective view illustrating the structure of the stator to which the present invention is applied.

With reference to FIG. 2, there will be described, in detail, the structure of main portions of the stator 20 used in the rotating electrical machine 10 in the present example. The stator 20 is constituted by the stator core 21, and the stator coil 60 wound in the plurality of the slots 15 provided in the inner peripheral portion of the aforementioned stator core. The stator coil 60 is constituted by conductive bodies (copper wires in the present example) with a substantially-rectangular shaped cross section, which increases the space factor in the slots, thereby increasing the efficiency of the rotating electrical machine 10.

The stator core 21 is provided with 72 slots 15 which are opened in its inner-diameter side and are formed in the circumferential direction, for example. Further, a slot liner 200 is placed in each slot 15, which ensures electric insulation between the stator core 21 and the stator coil 60.

The aforementioned slot liners 200 are formed to have a B shape or an S shape in such a way as to wrap the copper wires. A varnish 205 is dropped thereon to fix she stator core 21, the stator coil 60 and the slot liners 200. The varnish 205 is penetrated into the gaps between the stator core 21, the stator coil 60 and the slot liners 200 to secure them. As the varnish 205, a polyester resin or epoxy resin varnish is employed.

The varnish 205 is penetrated into the slots 15. Further, the varnish 205 can be also applied to a coil end and a coil end 62, as required. As the method for applying the varnish 205 thereto, it is also possible to employ a drop impregnation method using a nozzle, or a method for immersing the stator in the varnish liquid surface.

Insulation paper 203 is used in such a way as to be placed in an annular shape between the segment conductors, for insulation between the phases and for insulation between the conductive bodies in the coil, ends 61 and 62. As described above, in the stator 10 according to the present embodiment, the insulation paper 203 is placed in the coil ends 61 and 62, which enables maintaining a necessary insulation withstand voltage, even in the event that the insulation coating is damaged or deteriorated. Further, the insulation paper 203 is constituted by an insulation sheet made of a heat-resistant polyamide paper and has a thickness of about 0.1 to 0.5 mm, for example.

With reference to FIG. 3, a method for winding the stator coil 60 will be described, in brief. A copper wire or aluminum wire with a substantially-rectangular-shaped cross section, which is electrically insulated with an enamel and the like, is shaped into a segment conductor 28 with a substantially-U shape having a counter-welded side coil end vertex 28C as a folded-back point, as in FIG. 3(a). In this case, the counter-welded side coil end vertex 28C can have any shape which folds back the orientation of the conductive body in the substantially-U shape. Namely, the shape thereof is not limited to such a shape that the counter-welded side coil end vertex 28C and conductive-body diagonal portions 26F of the counter-welded side counter-welded side coil end form a substantially rectangular shape, as in FIG. 3. For example, the counter-welded side coil end vertex 28C may partially have such a shape that the conductive body is substantially parallel with the end surface of the stator core 21 (a shape that the counter-welded side coil end vertex 28C and the conductive-body diagonal portions 28F of the counter-welded side coil end form a substantially trapezoidal shape, when viewed in the radial direction).

The segment conductor 28 is inserted into a stator slot in the axial direction. It is connected, at its conductive-body welded portion 28E, to another segment conductor 28 which has been inserted at a position spaced apart therefrom by predetermined slots 15, as in FIG. 3(b). The method for connecting them may be fused junction, liquid-phase/solid-phase reaction bonding, or solid-phase bonding, for example.

At this time, the segment conductor 28 has been provided with a conductive-body straight portion 28S which is the portion inserted in the slot 15, and a conductive-body diagonal portion 28D which is the portion inclined toward the conductive-portion welded portion 28E of the segment conductor to which this segment conductor has been connected. In the slot, 2, 4, 6 . . . (a multiple of 2) segment conductors are inserted. FIG. 3(c) illustrates an example where four segment conductors are inserted in a single slot, wherein the conductive bodies have a substantially-rectangular-shaped cross section, which can increase the space factor in the slot, thereby increasing the efficiency of the rotating electrical, machine.

Figure 4:
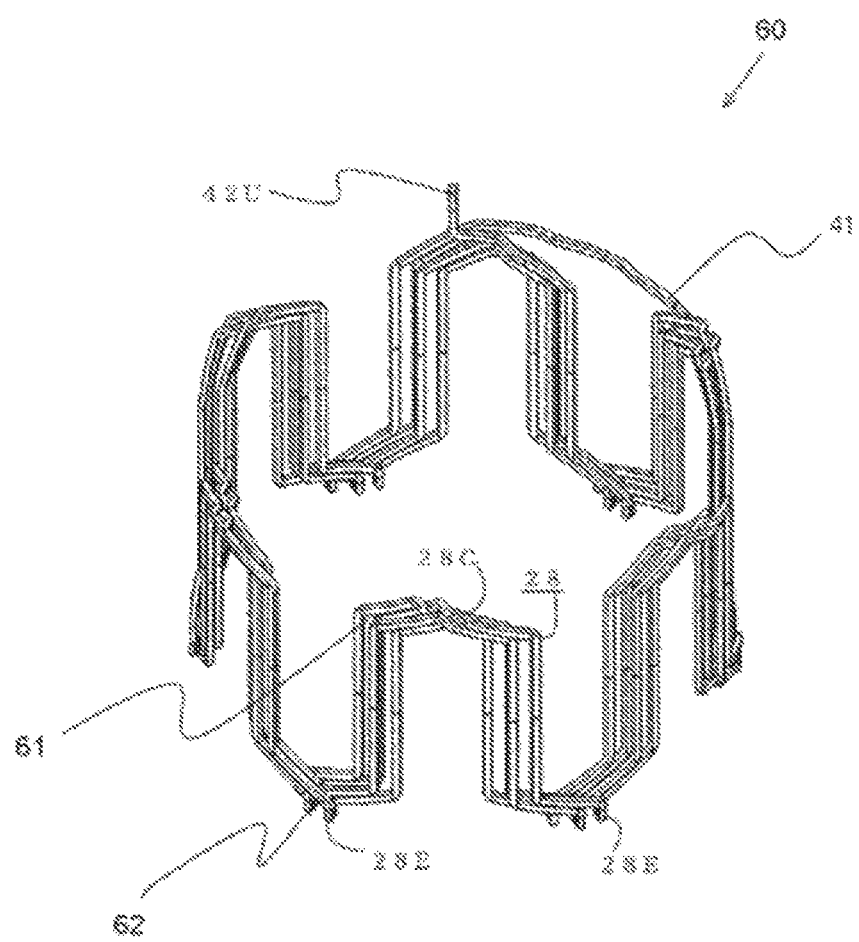
FIG. 4 is a perspective view illustrating a U-phase stator coil.

FIG. 4 is a view of a coil 60 corresponding a single phase (for example, a U phase) which was created by repeating the connecting operation in FIG. 3(b) until the segment conductors form an annular shape. The coil 60 corresponding to the single phase is formed such that the conductive-body welded portions 28E are gathered in a single axial direction, thereby forming a welded-side coil end 62 in which the conductive-body welded portions 28E are gathered, and a counter-welded side coil end 61. The coil 60 corresponding to the single phase is provided with a terminal for each phase (a U-phase terminal 42U in the example of FIG. 4) at its one end and, further, is provided with a neutral wiring 41 at the other end.

The stator coil 60 is connected in such a way as to have a star connection structure. Although it can be also delta-connected, the stator coil 60 employed in the present embodiment has a two-star structure having two star connections which are connected in parallel. The neutral-point connection conductive bodies 41 and the input/output coil conductive bodies 42U, 42V and 42W of the stator coil for the respective three phases, which are the V, W three phases are extracted therefrom. Namely, the stator coil 60 is structured by connecting the neutral-point connection conductive bodies 41 and the input/output coil conductive bodies 42U, 42V and 42W to respective stator coil main portions for the U, V and W phases.

Figure 5:
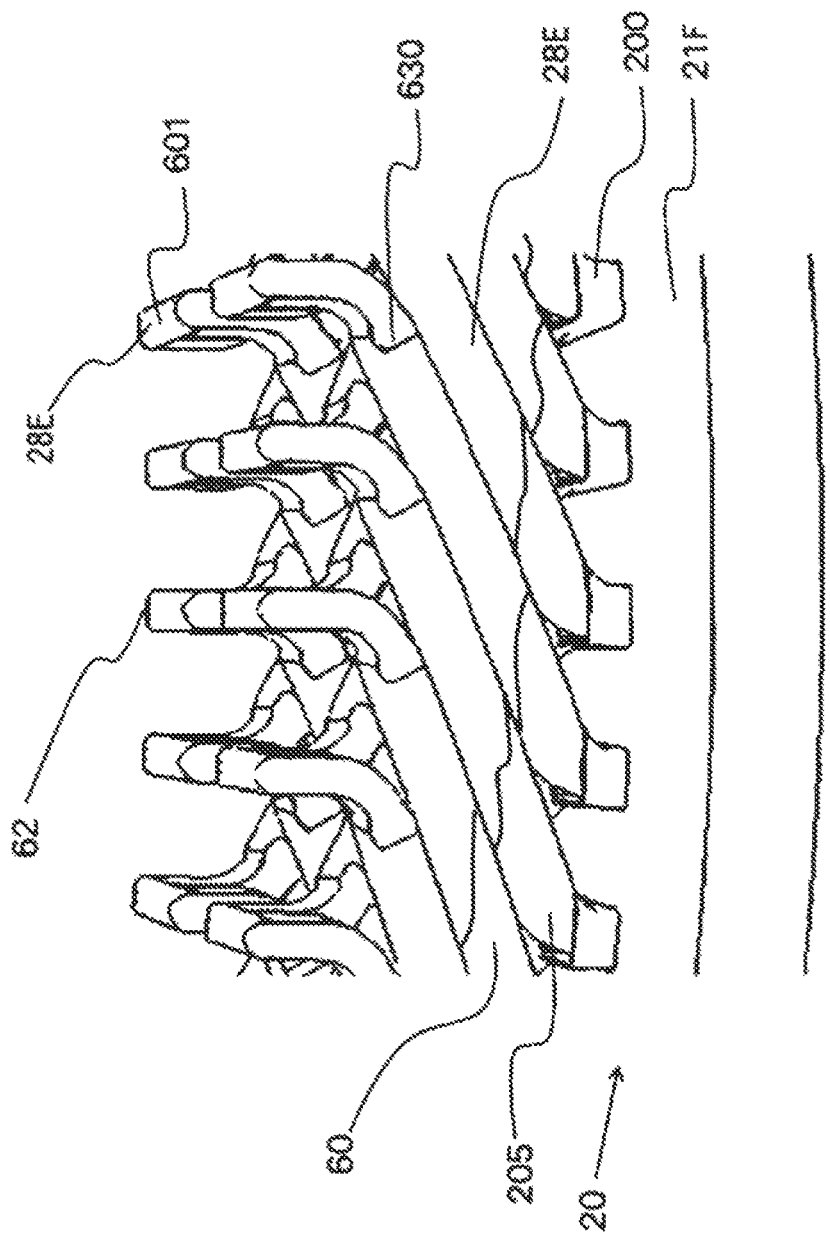
FIG. 5 is a cross-sectional perspective view illustrating a welded-side coil end portion of the stator coil in the rotational electrical machine after coating has been applied thereto.

With reference to FIG. 5, there will be described, in detail, the structure of the welded portion (the welded-side coil end 62) of the stator 20 used in the rotating electrical machine 10. The stator 20 is constituted by the stator core 21, and the stator coil 60 wound in the plurality of the slots 15 provided in the inner peripheral portion of the aforementioned stator core. The stator coil 60 is constituted by coils with a substantially-rectangular shaped cross section for increasing the space factor in the slots, thereby increasing the efficiency of the rotating electrical machine. In order to insulate the coils from each other, the annular-shaped insulation paper 203 is placed in an annular shape. In cases where insulation distances therebetween can be ensured due to the used electric voltage and the thickness of the enamel coating, it is not necessary to place the insulation paper 203. It is desirable that only the conductive-body welded portions 28E of the stator coil 60 are covered, through coating, substantially uniformly, with, for example, a resin material 601 having an average thickness 5 to 40 micrometers (for example, a novolak-type epoxy resin, a polyamide-imide resin, a polyimide resin, an acrylic resin, a polybutadiene resin, an alkyd resin, a polyester resin). However, the resin material 601 is not limited so these materials.

The varnish 205 is dropped to the slot liners 200 to fix the stator core 21, the stator coil 60 and the slot liners 200. They can be also adhered to the resin material 601, through the varnish 205. Further, in cases where a necessary insulation property can be ensured, the resin material 601 can provide a sufficient insulation property and, therefore, it is not necessary that they are covered.

The structure of the conductive-body welded portions 28E (the welded-side coil end 62) of the stator 20 will be described, in detail. The stator coil 60 is constituted by the coils with a substantially-rectangular shaped cross section for increasing the space factor in the slots, thereby increasing the efficiency the rotating electrical machine.

FIGS. 6(a) to (c) are plan views of a boundary portion 613 of a bare conductive body 602 with an insulating film 612 in the stator coil 60, wherein (a) is a view of a case where the resin material 601 has been adhered when the insulating film 612 is flat, (b) is a view of a case where the resin material 601 has been adhered when the insulating film 612 is outwardly diagonal, and (c) is a view of a case where the resin material 601 has been adhered when the insulating film 612 is inwardly diagonal.

As in FIGS. 6(b) and (c), when the insulating film 612 has been stripped off through a die or the like, it is possible to diagonally process the insulating film 612 in order to increase the area of the resin material 601 which comes in contact therewith, thereby further enhancing the intimate adhesion therebetween.

As illustrated in FIGS. 6(a) to (c), by applying the coating of the resin material 601 thereto such that the insulating film 612 and the resin material 600 have substantially the same thickness, at the boundary portion 630 between the insulating film 612 and the resin material 601, it is possible to inhibit the occurrence of exfoliations and the like at the boundary portion 630. This enables applying the coating of the resin material 601 in such a way as to inhibit the occurrence of sinks at the boundary portion 630, without space therebetween. In this case, the term "occurrence of sinks" refers to conditions where the resin material 601 is reduced in thickness to such an extent that a sufficient insulation property cannot be ensured at the boundary portion 630.

The conductive-body welded portions 28E of the stator coil 60 are covered, through coating, substantially uniformly, with only the resin material 601 with an average thickness of 5 to 50 micrometers. This average thickness is determined in consideration of a partial discharge-starting voltage. Further, by making it have a predetermined thickness, it is possible to prevent dusts in the ATF and, also, it is possible to enhance the moisture resistance, the insulation property and the heat resistance of the conductive-body welded portions 28E. With this structure, it is possible to satisfy the insulation property required for electric vehicles and hybrid electric vehicles.

Further, it is also possible to apply coating of the resin material 601 to positions at which the insulating film has smaller thicknesses due to flaws, depressions and indentations induced during the insertion of the stator coil 60 into the stator core 21, the formation of the coil, and the like.

The conductive-body welded portions 28E correspond to the bare conductive body 602 from which the insulating film 612 has been stripped off. This bare conductive body 602 from which the insulating film has been stripped off is reduced in size to such an extent that it has a cross section which exerts no influence on its electrical and mechanical strengths, for example, during the processing for stripping off the insulating film 612 therefrom. This can reduce the size of the coil end 62. As the method for stripping off the insulating film therefrom, it is possible to employ agents, tools, heating or other methods. In the present example, stripping-off of the insulating film using a stripping die is exemplified.

It is desirable that the thickness of the resin material 601 which is applied as coating after the connection through welding or the like is equal to or less than the that of the enamel as the insulating film 612. However, the thickness of the resin material 601 is not limited thereto. By making the thickness of the resin material 601 equal to or less than that of the enamel as the insulating film 612, it is possible to reduce the size of the coil end portion in the radial and axial directions.

Further, the insulating film 612 may be an enamel layer (a polyamide resin, a polyamide-imide resin, or a polyester-imide resin), but can be also made of a PPS material or a PEEK material.

FIGS. 7 (a) to (c) are plan views of a boundary portion 613 of a bare conductive body 602 with an insulating film 612 constituted by three layers in the stator coil 60, or example, wherein (a) and (b) are views of cases where the resin material 601 has been adhered when the boundary portion 613 of the insulating film 612 is flat, and (c) is a view of a case where the resin material 601 has been adhered when the boundary portion 613 of the insulating film 612 is diagonal, and the insulating film 614 is left as a single layer on the conductive body.

Figure 7A:
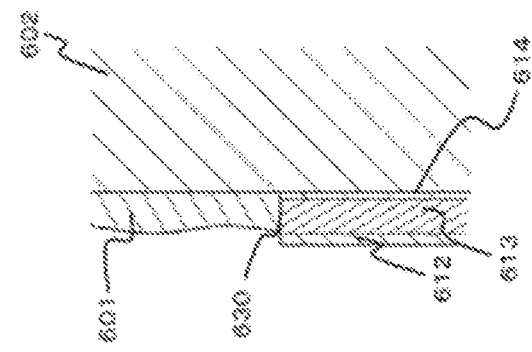
FIGS. 7A-7C are a plan view of a boundary portion of a bare conductive body with an insulating film constituted by three layers in the stator coil, wherein (a) is a view of a case where a resin material has been adhered when the insulating film is flat, (b) is a view of a case where the resin material has been adhered when the insulating film is flat, and (c) is a view of a case where the resin material has been adhered when the insulating film is diagonal, and there is a single layer of an enamel coating.

In the case of FIG. 7(a), by applying coating of the resin material 601 thereto such that the boundary portion 630 between the insulating film 612 and the resin material 601 has substantially the same thickness as that of the second layer in the insulating film 612, it is possible to prevent the occurrence of a gap at the boundary portion 630, thereby inhibiting the occurrence of exfoliations and the like.

Figure 7B:
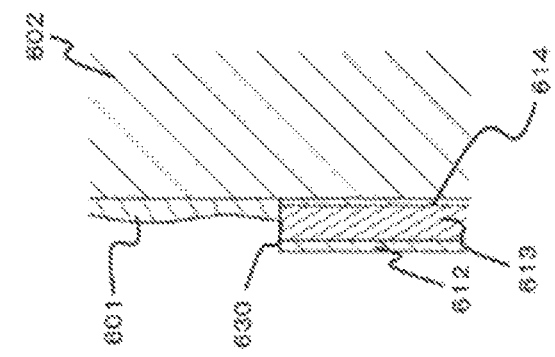

Similarly, in the case of FIG. 7(b), by applying coating of the resin material 601 thereto such that the boundary portion 630 between the insulating film 612 and the resin material 601 has substantially the same thickness as that of the second layer in the insulating film 612, it is possible to prevent the occurrence of a gap at the boundary portion 630, thereby inhibiting the occurrence of exfoliations and the like. This provides the advantage of unnecessity of other materials than the resin material required for the insulation withstand voltage.

Figure 7C:
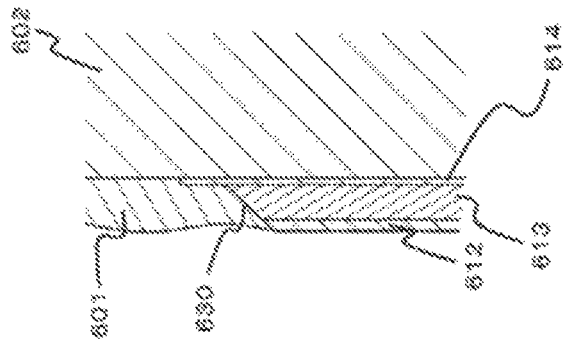

FIG. 7(c) is a view of a case where the resin material 601 has been adhered when the insulating film 612 is diagonal, and the insulating film 614 on the conductive body (the insulation layer on the conductive body), in the insulating film 612, is left as a single layer. It is possible to apply coating of the resin material 601 onto the insulating film 614 as the first layer through application of a voltage thereto. Further, by increasing the applied voltage, it is also possible to apply coating thereof in such a way as to cover the insulating film 613 as the second layer, as illustrated in FIG. 7(c). Even when the insulating film 614 on the conductive body has been left in the stripping-off processing, it is possible to apply coating of the resin material 601 thereto such that it covers the insulating film on the conductive body, which can ensure an insulation property.

The present example has been described in detail in order to describe the present invention such that it can be easily understood, and it is also possible to apply coating, similarly, even when the insulating film is formed from three or more layers. For example, even when the insulating film is formed from only a single layer or even when only the portion on the conductive body, in the insulating film, has been left without being removed, it is possible to apply coating of the resin material 601 thereto such that it covers the insulating film on the conductive body, which can ensure an insulation property.

FIG. 8 illustrates a state where the varnish 205 has been applied as coating over the entire stator 20. By applying the coating of the varnish 205 using pre-heating for curing the resin material 601, it is possible to simplify the production processes. By applying the coating of the varnish 205 thereto, it is possible to prevent dusts in the ATF and, also, it is possible to enhance the moisture resistance, the insulation property and the heat resistance of the conductive-body welded portions 28E and the entire stator 20.

FIG. 9(a) is a plan view of a boundary portion 630 of a bare conductive body 602 with an insulating film 612 in the stator coil 60, in an example where the resin material 601 is made to have a larger thickness in cases of requiring a larger insulation property and the like. Further, it is applied as coating in such a way as to cover the insulating film 612, which inhibits exfoliations thereof and, also, improves the insulation property.

FIG. 9(b) is a plan view of a case where the resin material 601 has been adhered such that it has a larger thickness than that of the insulating film 612. This can ensure an insulation distance, when insulation distances are required between the coils, and when there is the liquid-cooling jacket 130 for the casing, and the like, around the coil end upper surface and side surfaces.

FIG. 9(c) is a plan view of a case where the resin material 601 has been adhered such that it has a larger thickness, when the insulating film 612 is diagonal. This can ensure an insulation distance, when insulation distances are required between the coils and when there is the liquid-cooling jacket 130 for the casing and the like around the coil end upper surface and side surfaces. Further, the area of the resin material 601 which comes in contact with the insulating film 612 is increased, which inhibits the occurrence of exfoliations and cracks and the like. This can satisfy the insulation properties required for electric vehicles and hybrid electric vehicles.

Figure 10:
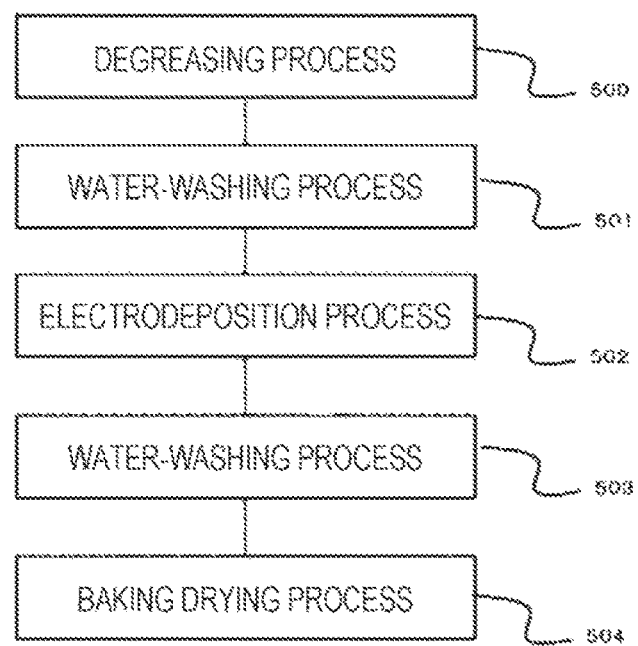
FIG. 10 is a flow chart illustrating fabrication processes according to the present invention.

FIG. 10 illustrates an example of electrodeposition in a process 510 for applying coating of the aforementioned resin 601. At first, a process 500 for degreasing the bare conductive body 602 is performed. Contaminations such as oils and fats, oxide layers and the like which have been adhered to the bare conductive body are removed if it is unnecessary to remove them, this process can be eliminated. Next, a water-washing process 501 is performed for washing away the liquid adhered thereto in the degreasing process 500. The electrodeposition process 502 is performed using an electrode within an electrodeposition bath as a positive electrode (+) and the stator 20 as a negative electrode (−).

As the temperature of the electrodeposition coating material increased, the resistance decreases, which tends to decrease the thickness. Therefore, the temperature of the coating material is set to about 28 degrees C.

Electricity is supplied using the input/output coil conductive bodies 42U, 42V and 42W. The applied voltage and the time therefor are adjusted according to the required film thickness of the resin material 601. The film thickness of the resin material 601 can be controlled through the time and the value of a leaked electric current. As the method for supplying electricity thereto, there are constant electric-current methods, constant voltage methods and combinations of them, wherein the electric current and the voltage are such that the electric resistance s increased as the electrodeposition proceeds. An appropriate electricity-supply time is 1 to 5 minutes. Further, by managing the concentration of the electrodeposition coating liquid while performing replenishment thereof, it is possible to form a stable film pressure. It is necessary to sufficiently stir the coating material in such a way as to prevent non-uniformity in the entire coating material. As the concentration is increased, the electrodeposition is promoted, but the surface is more prone to become rough. In general, the concentration is set to 10 to 15%. When an electric current flows from the coated portion, resin particles at the surface are precipitated, and are fusion-bonded thereto due to the Joule heat. Thus, a film with an insulation property is formed.

It is also possible to insert the stator 50 into the electrodeposition bath for applying coating thereto, but this necessitates a longer operation time, thereby inducing a larger coating loss. Therefore, only the bare conductive body 602 and the periphery thereof are inserted into the electrodeposition bath. This can shorten the operation time. Next, the water-washing process 501 is performed for washing away she liquid adhered thereto during the aforementioned electrodeposition process 502. It is also possible to use air blowing for blowing away the liquid and, therefore, the water-washing process can be eliminated. At last, it is dried within a furnace in a baking drying process 503. Thus, the bare conductive body 602 which forms the welded portions of the aforementioned stator coil can be covered, through coating, substantially uniformly with only the resin 601 having an average thickness of 5 to 50 micrometers. The coating process is not particularly limited thereto. Dripping of the coating material prevented, which prevents waste of the coating material, thereby minimizing the amount of the used coating material.

In the aforementioned example, only the bare conductive bodies 602 in the conductive-body welded portions 28E are covered, substantially uniformly, with only the resin material 601 with an average thickness of 5 to 50 micrometers. By applying the coating of the resin material 601 such that it has a smaller thickness than that of the insulating film 612 through electrodeposition, it is possible to reduce the size in the radial and axial directions. It can be adhered with higher throwing power even to the corner portions and the welded portions which have complicated shapes, which can realize a uniform film thickness. The film thickness contains no pin-holes and the like and, therefore, has an excellent rust prevention property and an excellent insulation property.

When the voltage is lower, a bulge portion is formed at the boundary surface portion, although it is not overlaid on the insulating film. If the voltage is increased, the resin material 601 formed through the electrodeposition covers up to the outer peripheral side of she insulating film.

Further, by supplying electricity to the stator core 21, it is also possible to apply coating of the resin material 601 to the stator core 21, thereby further improving the insulation property.

As described above, only the bare conductive bodies 602 in the conductive-body welded portions 28E in the stator coil 60 are covered, substantially uniformly, with only the resin material 601 with an average thickness of 5 to 50 micrometers, so that in is formed to be thinner than the insulating film 612, through the electrodeposition 502, which enables reduction of the size in the radial and axial directions. Further, through the electrodeposition, the resin material can be intruded into the gaps in the conductive-body welded portions 28E having complicated shapes. This enables provision of a rotating electrical machine capable of satisfying an insulation property required for electric vehicles and hybrid electric vehicles. It is also possible to offer the same effects, even in cases of oxygen-free coppers and tough pitch coppers.

The resin material can have excellent throwing power even at the boundary portions of the insulating films 612 on the bare conductive bodies 602 and at the corner portions and the edge portions at the positions subjected to the die peeling, which can provide an excellent insulation property. Further, it is possible to provide a uniform film thickness and, at the same time, it is possible to improve the productivity more than in cases of powder coating.

Further, by applying the coating of the resin material 601 such that it is thinner and uniform, it is possible to prevent cracks and the like in the resin material 601 due no differences in shrinkage rate. Further, this can prevent the occurrences of wrinkles and bulges, which enables provision of a rotating electrical machine having higher reliability.

Even in the event of temperature changes in the stator coil 60 and temperature changes inside the rotating electrical machine 10, the resin material 601 is adhered only to the bare conductive bodies 602 in the conductive-body welded portions 28E and, therefore, induces smaller thermal stresses therein. This can provide the stator coil which undergoes less thermal influences, thereby providing a rotating electrical machine with higher reliability. Further, the resin material is adhered to only the conductive-body welded portions 28E and, therefore, is not influenced by stresses between the adjacent conductive-body welded portions 28E.

Further, even if the resin material 601 is subjected to temperature changes in the ATF, the resin material 601 is adhered only to the bare conductive bodies 602 and, therefore, is less expanded and contracted thermally, which can inhibit cracks and the like in the resin material 601, thereby providing the rotating electrical machine with higher reliability.

In cases where a polyamide-imide resin or a polyimide resin is used as the resin material 601 formed by the electrodeposition, the resin material 601 is semi-transparent or transparent, which facilitates external-appearance inspections even after the conductive-body welded portions 28E have been coated therewith.

Further, without placing the insulation paper 203 in an annular shape between the segment conductors for insulation between the phases and insulation between the conductive bodies in the coil end 61 and the coil end 62, it is possible to repair, through the electrodeposition, portions which have been deteriorated in insulation property, due to damages such as flaws and indentations in the insulating film, which were formed during the formation of the coil end 62 and the connections of the coils, and due to floating, exfoliations and the like of the enamel coating. This enables eliminating the insulation paper 203 for insulation between the phases and insulation between the conductive bodies, thereby improving the productivity.

Although a permanent-magnet type rotating electrical machine has been described, the characteristics of the present invention relate to insulation of the coils in the stator and, therefore, the present invention can be also applied to rotors of induction-types, synchronous-reluctance types, claw magnetic-pole types and the like, as well, as rotors of permanent magnet types. Further, the way winding a wave-winding type, but the present invention can be also applied no any ways of winding having similar characteristics (for example, concentrated winding and concentrical winding). Next, an inner-rotor type has been described, but the present invention can be also applied to outer-rotor types.

Figure 11:
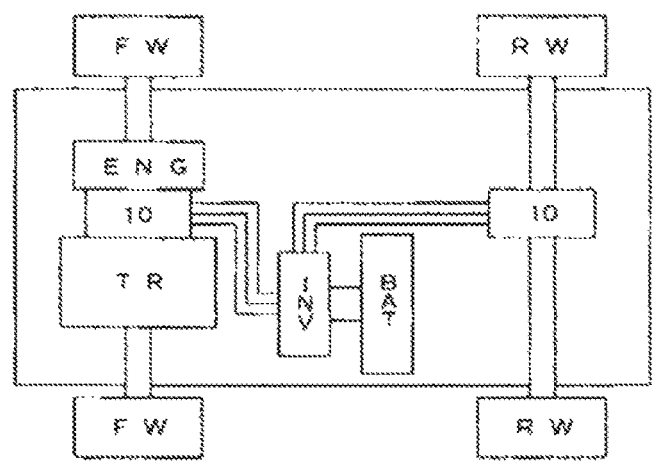
FIG. 11 is a block diagram illustrating the structure of a vehicle incorporating a rotating electrical machine according to the present invention.

With reference to FIG. 11, there will be described the structure of a vehicle incorporating the rotating electrical machine 10 in the present example. FIG. 11 illustrates a power train in a hybrid vehicle which is predicated on four-wheel driving, it includes an engine ENG and a rotating electrical machine 10 as a front-wheel main power source. The power generated from the engine ENG and the rotating electrical machine 10 is changed in speed by a transmission TR, and the power is transmitted to front-wheel side driving wheels FW. Further, for driving the rear wheels, a rotating electrical machine 10 placed in the rear-wheel side is mechanically connected to rear-wheel side driving wheels RW, thereby transmitting power thereto.

The rotating electrical machine 10 starts operating the engine and, further, changes over between the generation of driving power and the generation of electric power by collecting energy during vehicle speed reduction as electric energy, depending on the state of running of the vehicle. An electric-power conversion device INV controls the driving operations and the electric-power generating operations of the rotating electrical machine 10, according to the state of operations of the vehicle, in such a way as to optimize the torque and the rotating speed. The electric power required for driving the rotating electrical machine is supplied from a battery BAT through the electric-power conversion device INV. Further, during electric power generating operations of the rotating electrical machine 10, the electrical energy is supplied to the battery BAT through electric-power conversion device INV.

In this case, the rotating electrical machine 10 as the front-wheel side driving power source is placed between the engine ENG and the transmission TR and has the structure described with reference to FIGS. 1 to 9. The rotating electrical machine 10 as the rear-wheel side driving power source can be constituted by either one of the same type or a rotating electrical machine with another ordinary structure. Further, the present invention is also applicable to hybrid types which are different from four-wheel driving types, as a matter of course.

While the aforementioned example has been described with respect to a stator coil constituted by segment conductors, the present invention can be also applied to any portion for insulating bare conductive bodies (portions provided with no insulating film), in principle. Therefore, the present invention can be also utilized for insulation of bare conductive bodies in a rotor coil, for example.

As described above, according to the present invention, it is possible to provide a rotating electrical machine with an excellent insulating property.

Further, the present invention is not intended to be limited to the aforementioned example and is intended to embrace various modification examples. For example, the present example has been described in detail in order to describe the present invention such that it can be easily understood, and the present invention is not necessarily limited to those including all the described structures. Further, for a portion of the structure in the example, it is also possible to perform addition, elimination and substitution of other structures.

REFERENCE SIGNS LIST

10 rotating electrical machine
11 rotor
12 stator core
13 rotational shaft
15 slot
20 stator
21 stator core
28 segment conductor
28C counter-welded-side coil end vertex
28D conductive-body diagonal portion
28E conductive-body welded portion
28F conductive-body diagonal portion
41 neutral wiring
42U U-phase terminal
42V V-phase terminal
42W W-phase terminal
50 housing
60 stator coil
61 coil end
62 coil end
130 cooling jacket
144 bearing
145 bearing
153 refrigerant path
154 refrigerant outlet
155 refrigerant outlet.
200 slot liner
203 insulation paper
205 varnish.
500 degreasing process
501 water-washing process
502 electrodeposition process
503 curing process
510 electrodeposition process
601 resin material
602 bare conductive body
612 insulating film
630 boundary portion
RF refrigerant

The invention claimed is:

1. A coil comprising:
   a covered portion comprising a conductive body and an insulating film covering the conductive body; and
   a stripped portion at which the insulating film has been stripped off, wherein
      the insulating film is constituted by three layers,
      the stripped portion is provided with coating of a resin material, and
      a boundary portion between the insulating film and the resin material has a same thickness as a combined thickness of the first and second layer in the insulating film.

2. The coil according to any one of claim 1, wherein the resin material has an average thickness of 5 to 50 micrometers.

3. A rotating electrical machine comprising the coil according to claim 1.

4. A method for manufacturing a coil comprising:
providing a covered portion comprising a conductive body and an insulating film covering the conductive body;
providing a stripped portion at which the insulating film has been stripped off;
supplying electricity to the conductive body using an electrode in an electrodeposition bath as a positive electrode and using the conductor as a negative electrode for adhering to a resin material to the stripped portion, wherein
the insulating film is constituted by three layers,
the stripped portion is provided with coating of a resin material, and
a boundary portion between the insulating film and the resin material has a same thickness as a combined thickness of the first and second layer in the insulating film.

5. The method for manufacturing a coil according to claim 4, comprising
providing segment conductors each having the covered portion and the stripped portion,
connecting two different segment conductors, out of the segment conductors, to each other, at their stripped portions, in a coil end, to form a connection part, and
supplying electricity to the conductive body, such that the resin material has a thickness equal to or less than a thickness of the insulating film, at a boundary portion between the covered portion and the stripped portion, in the electrodeposition process.

6. The method for manufacturing a coil according to claim 5, wherein
in the electrodeposition process, only the connection part and a periphery thereof are inserted in the electrodeposition bath.

* * * * *